United States Patent [19]

Suzuki

[11] Patent Number: 4,665,945

[45] Date of Patent: May 19, 1987

[54] PRESSURE REGULATOR FOR A FUEL GAS

[75] Inventor: Hiroshi Suzuki, Saitamaken, Japan

[73] Assignees: Kabushiki Kaisha Asahi Seisakusho, Saitamaken; Iwatani Sangyo Kabushiki Kaisha, Osaka, both of Japan

[21] Appl. No.: 838,262

[22] Filed: Mar. 10, 1986

[30] Foreign Application Priority Data

Apr. 4, 1985 [JP] Japan .................................. 60-71586

[51] Int. Cl.⁴ ............................................. F16K 17/00
[52] U.S. Cl. ..................... 137/613; 137/463; 137/505.47; 137/510; 251/65; 251/73
[58] Field of Search ................... 137/613, 463, 505.47, 137/510; 251/73, 65

[56] References Cited

U.S. PATENT DOCUMENTS

| | | | |
|---|---|---|---|
| 797,664 | 8/1905 | Cottingham et al. | 137/463 |
| 2,692,113 | 10/1954 | Larkin, Jr. | 251/73 |
| 3,121,552 | 2/1964 | Wilson | 251/65 |
| 3,225,753 | 12/1965 | Bintz | 251/65 |
| 3,228,417 | 1/1966 | Schwerter | 137/463 |
| 3,422,841 | 1/1969 | Farrer | 251/73 |
| 3,818,928 | 6/1974 | Carsten | 251/65 |

Primary Examiner—A. Michael Chambers
Attorney, Agent, or Firm—Schwartz, Jeffery, Schwaab, Mack, Blumenthal & Evans

[57] ABSTRACT

A pressure regulator for a fuel gas of the present invention operates to reduce the pressure of the fuel gas kept in a gas container to the predetermined pressure and then supply it to a burner through the secondary passage thereof. Further, the pressure regulator includes a shutoff valve disposed in the primary passage thereof and an actuator of which operation chamber connects to the secondary passage. In the shutoff valve, there is provided a valve body displaceable between the valve open position and the valve shutoff position and sustained in the valve open position by the attractive force of a magnet against the valve closing force by a valve closing means in the normal condition. In case the pressure in the secondary passage is increased abnormally, the actuator is driven by the increased secondary pressure so as to move the magnet away from the valve body and hence to close the primary passage by the valve body.

7 Claims, 4 Drawing Figures

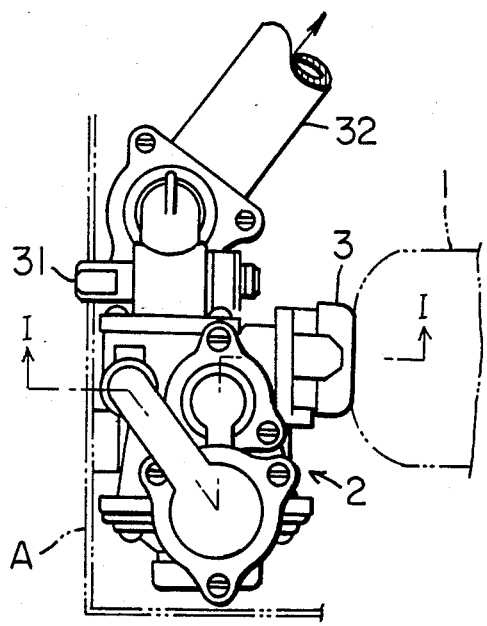
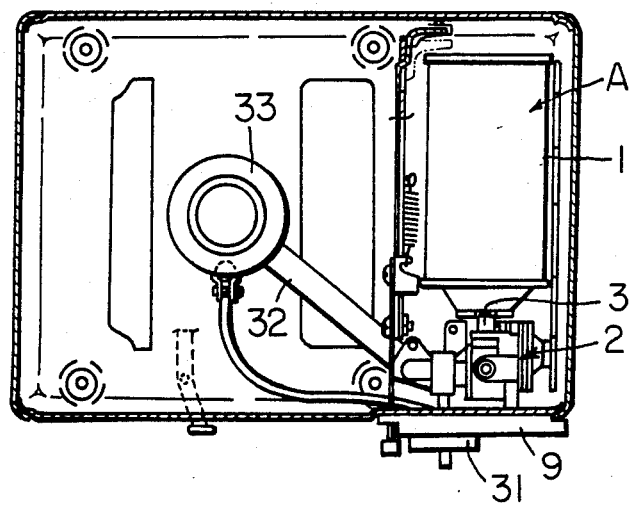

PRESSURE REGULATOR FOR A FUEL GAS

BACKGROUND OF THE INVENTION

1. Field of the Invention

The present invention relates to a technique to cope with an abnormal increase of a secondary pressure in a pressure regulator for a fuel gas which is fed to a burner from a gas container with its pressure reduced to a predetermined pressure by the pressure regulator.

2. Prior Art

It is known in the art that a pressure regulator for a fuel gas has the construction that a primary passage and a secondary passage are connected to each other through a pressure reducing valve. When the pressure reducing valve goes wrong or a foreign substance is caught in the valve seat thereof, the pressure reduction function of the the valve is disordered and hence the pressure in the secondary passage is increased abnormally. thereupon, an abnormal combustion or a flame-out is caused in the burner with being attended with danger.

As a means to cope with the abnormal increase of the secondary pressure, such a regulator has so far been on the market, for example as the pressure regulator used for the LPG container which is placed outdoors and of which the secondary pressure is kept in the predetermined pressure by releasing a certain amount of fuel gas to the atmosphere through the relief valve connected to the secondary passage.

On the other hand, the inventor of the present invention invented such a regulator (hereinafter referred to as a previously conceived embodiment) as shown in FIG. 4, wherein a diaphragm cylinder 170 as an actuator is driven by the abnormally increased pressure in a secondary passage 150 and then a valve body 70 in a shutoff valve 50 is pushed to the shutoff position by the cylinder through an output rod 122 and a valve rod 70c, wherein the primary passage is closed.

However, the pressure regulators in the abovementioned prior art have following problems.

A. In the case of the former regulator brought to market: In spite of its advantageous feature that the abnormal increase of the secondary pressure therein attended with the danger can be prevented effectively, the regulator has the following problems.

(a) The regulator is in danger of deriving a secondary accident from the ignition of the fuel gas released to the atmosphere by the relief valve. Especially, in a gas oven equipped with a gas cartridge therein, as a fuel gas is to be released near the burner thereof, the danger of firing is brought more conspicuous.

(b) Even though an abnormal condition such as a fuel gas release from the actuated relief valve is caused, it might not be noticed by anybody because the burner can keep the normal combustion continuously. Therefore, in order to detect such a dangerous condition, it is necessary to provide for a gas-leak alarm.

(c) The gas fuel released to the atmosphere by the relief valve is wasted in the result.

B. In the case of the latter regulator as the previously conceived embodiment: The regulator has the advantagous feature that it can solve such foregoing problems of (a) through (c) as itemized above in the prior art embodiment, but it still has the following problems.

(d) Even though an O-ring 50c is provided for sealing the gap between the valve rod 70i c and the through-hole 50b, which is bored in the end wall 50a of the valve chamber 60 in the shutoff valve 50, a danger of a gas leak due to an injury of the O-ring 50c is still remained.

(e) The outward pushing force by the primary pressure and the frictional resistance force by the O-ring 50c exert on the valve rod 70c and, in the result, affect upon the diaphragm cylinder 170 as a large operational resistance force. That is, the primary pressure functioning as the outward pushing force to the valve rod 70c is about 100 times as high as the secondary pressure functioning as the driving force to the diaphragm cylinder 170 (for example, in the case of the gas oven equipped with the gas cartridge, the primary pressure of butane gas is ab.3 kg/cm$^2$ and the secondary pressure thereof is 280 mm aq.). In addition thereto, the O-ring 50c has to exert the substantially high frictional resistance force onto the rod 70c in order to seal the high primary pressure. Therefore, it is necessary that the pressure receiving area of the diaphragm cylinder 170 has to be enlarged in order to operate accurately according to the low secondary pressure.

(f) ln case that the O-ring 50c is glued to the valve rod 70c by its secular degeneration, the diaphragm cylinder 170 becomes impossible to actuate the valve body 70 in the shutoff valve 50 through its output rod 122 and the valve rod 70c, and hence the reliability of the shutoff valve is lowered.

SUMMARY OF THE INVENTION

It is an object of the present invention to solve the problems of (a) through (f) itemized above.

Briefly, this and other objects of the invention are accomplished by an improved pressure regulator for a fuel gas, for example as shown in FIG. 1.

In a pressure regulator for a fuel gas including a primary passage, a secondary passage and a pressure reducing valve therebetween, the primary passage is provided with a shutoff valve, which is constructed such that a valve body in a valve chamber is urged to a valve shutoff position by a valve closing force of a valve closing means and also urged by a magnetic force of a magnet so as to be lifted up against the valve closing force. The magnet is disposed outside the end wall of the valve chamber opposing to the valve body. A secondary passage is connected to an operation chamber of an actuator. The output portion of the actuator is interlocked to the magnet. When the pressure in the secondary passage exceeds abnormally the predetermined pressure set up by the pressure reducing valve, the actuator is driven so as to move the magnet away from the valve body and weaken the valve opening force by the magnet in order to close the primary passage by means of the valve body urged by the valve closing means.

Functionally, the shutoff valve provided in the primary passage is to be opened by the attractive force of the magnet disposed outside the end wall of the valve chamber. The fuel gas in the gas container is to be fed to the pressure reducing valve through the primary passage and the pressre of the fuel gas is to be reduced to the predetermined pressure thereby, and then it is to be fed to the burner through the secondary passage.

In these conditions, the attractive force of the magnet functions as the force enough to overcome the valve closing force exerted on the valve body by the valve closing means and keeps the shutoff valve opened.

In case the secondary pressure exceeds abnormally the predetermined pressure set up by the pressure reducing valve, the output portion of the actuator is driven by the increased pressure in the operation chamber of the actuator connected to the secondary passage, so as for the magnet interlocked with the output portion to be moved away from the valve body. Therefore, as the valve opening force by the magnet is weakened, the valve closing force by the valve closing means overcomes the valve opening force and then closes the primary passage through the valve body.

When the valve body closes the primary passage, the gas pressure in the valve chamber also functions as the valve closing force to the valve body and is added to the valve closing force of the valve closing means so as to make more powerful resultant force. Accordingly, the valve closing force by the valve closing means is in such a small intensity enough to close the shutoff valve and the magnetic force by the magnet only needs such a small intensity enough to overcome the small valve closing force by the valve closing means.

Consequently, the actuator only has to have such a output enough to enable the magnet to be displaced away from the valve body by overcoming the magnetic force which functions as an operational resistance force. And the valve chamber in the shutoff valve is seale.d completely by the end wall and the valve body, and it does not cause any fuel gas leak when being exposed to the primary pressure.

The foregoing and other objects and attendant advantages of the present invention will become clear when considered in connection with the accompanying drawings, wherein:

BRIEF DESCRIPTION OF THE DRAWINGS

FIG. 2 is a plan view of the pressure regulator in FIG. 1.

FIG. 3 is a plan view showing an embodiment of the gas oven equipped with the gas cartridge, to which the pressure regulator of the present invention is applied;

DETAILED DESCRIPTION OF THE PREFERRED EMBODIMENTS

In FIGS. 2 and 3, the symbol A is a frame work of a portable gas oven eguipped with a disposable small gas cartridge exchangeably, 1 is a gas container filled with a liquefied petroleum gas(LPG), 2 is a pressure regulator according to the present invention, 3 is a connecting mouth of the gas cartridge, 31 is a flow controller for a secondary pressure of such a fuel gas from the pressure regulator, and 32 is a gas pipe for supplying the secondary pressure gas to a burner 33.

Figure 1:
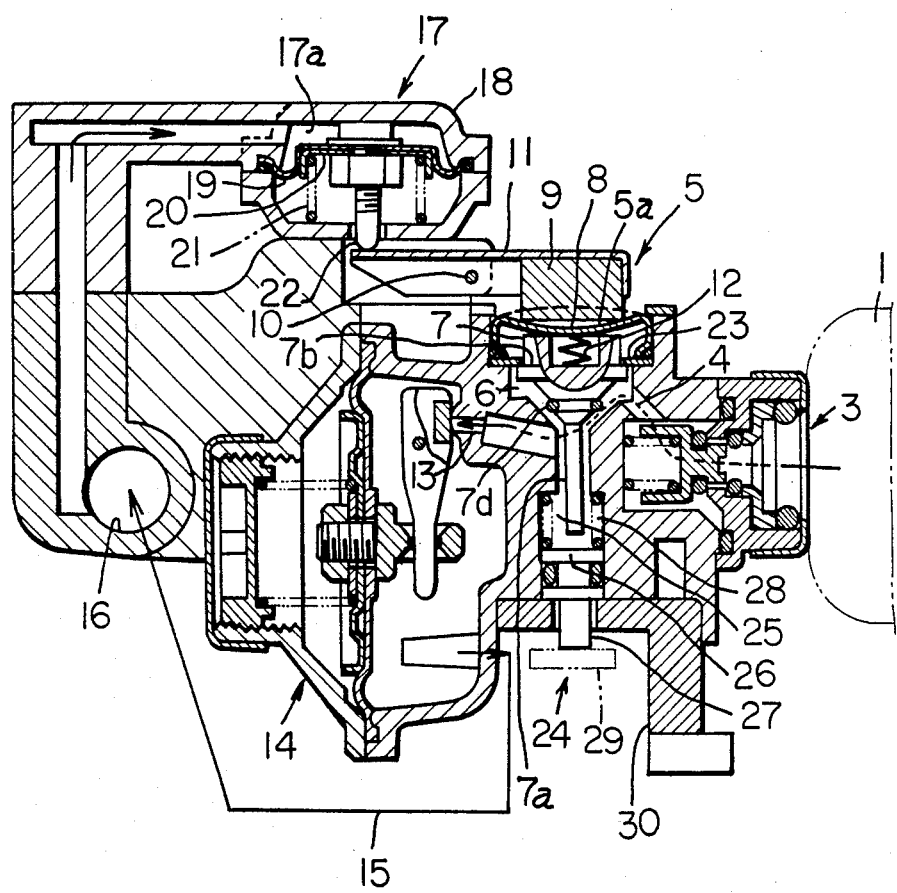
FIG. 1 is an elevational view in longitudinal section showing a preferred embodiment of a pressure regulator for a fuel gas of the present invention applied to a gas oven eguipped with a gas cartridge.
Figure 4:
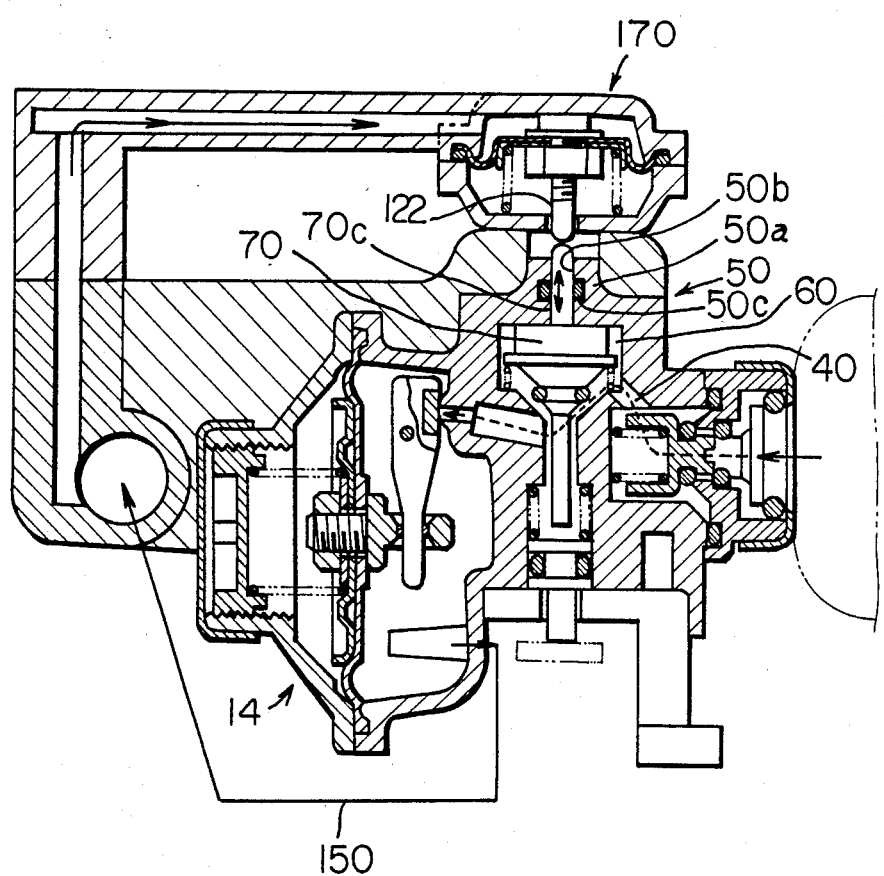
FIG. 4 is a sectional view of the principal part of a pressure regulator according to a previously conceived embodiment.

As shown in FIG. 1, the pressure regulator comprises a primary passage extended from the connecting mouth 3 of the gas container 1 to a diaphragm cylinder type pressure reducing valve 14, a shutoff valve 5 provided in the primary passage 4, a secondary passage 15 connected to the primary passage 4 through the pressure reducing valve 14 and a diaphragm cylinder type actuator 17 which leads to the secondary passage 15 through a gas supply port 16 and controls the shutoff valve 5.

The shutoff valve 5 is copmposed of a valve chamber 6 connected to the connecting mouth 3 of the gas container 1 through the primary passage 4, a passage 13 connecting between the valve chamber 6 and the passage 13 and a valve body 7 which operates to open or shut the primary passage 4 by its vertical movement within the valve chamber 6. The axis of the valve chamber 6 is directed vertically in such a way to intersect the holizontal and longitudinal direction of the primary passage 4.

The upper end wall 5a of the valve chamber 6 is closed by a deformable snap leaf spring 8. A permanent magnet 9 is disposed outside the snap leaf spring 8 so as to sustain the valve body 7 toward the spring 8 by its attractive magnetic force and, in the normal condition, to block the valve closing motion of the valve body 7 by its own weight functioning as a valve closing means.

The permanent magnet 9 is fixed to one end of a movement switching lever 11 which is supported swingably by a pivot 10 as a fulcrum, the other end of which is interlocked to a output rod 22 of the actuator 17. In case the secondary pressure in the secondary passage 15 exceeds abnormally the predetermined pressure set up by the pressure reducing valve 14, the actuator 17 is driven by the increased secondary pressure so as for the output rod 22 to depress the end of the lever 11 and at the same time raise the other end thereof together with the magnet fixed thereto. Hence, the magnet 9 is moved away from the valve body 7, which is then lowered by its own weight, and an O-ring 7d fitted in the valve body 7 is pressed onto a valve seat 6a by the gravitation thereof to close the primary passage 4 in the result.

The valve closing force is enhanced after the valve body 7 is displaced to the valve shutoff position, because the pressing force corresponding to the cross-section area of a valve stem 7a exerted by the primary pressure is further added to the gravitation of the valve body 7. Accordingly, the valve body 7 can close the primary passage more accurately owing to the enhanced force.

While the valve body 7 which opens or closes the passage by its vertical movement is described above, it is to be understood that a valve body which operates to open and close the passage by its holizontal movement is also applicable to the shutoff valve. In this case, as a valve closing means 12, for example a valve closing spring shown by a broken line in FIG. 1 can be utilized.

The actuator 17 is composed of a diaphragm cylinder 18, a diaphragm 19 arranged within the cylinder 18 so as to be exerted by the secondary pressure, a spring 21 for supporting the diaphragm 19 through a washer 20 and the output rod 22 connected to the diaphragm interlockingly, and it operates to depress the the diaphragm 19 in opposition to the spring 21 so as to depress the left end of the lever 11 through the output rod 22 when the secondary pressure is increased abnormally.

Otherwise, not only the secondary pressure increases abnormally, but also the primary pressure happens to increase abnormally. For example, the abnormal increase of the primary pressure is caused by the gas container being overheated abnormarlly due to unsuitable handling or positioning of the gas oven. Even in this case, the shutoff valve according to the present invention functions safely.

That is, when the primary pressure in the valve chamber 6 is increased abnormally, the snap leaf spring 8 which closes the upper end of the valve chamber 6 is deformed to the state indicated by the broken line in FIG. 1 by the expansion of the valve chamber 6 and then pushes up the permanent magnet 9. At that time, the valve body is also forced to move up, but the contact portion 7b formed on the valve body 7 contacts to the stopper 23 formed in the valve chamber 6, which blocks the moving up of the valve body 7 so as to separate away the valve body 7 from the magnet 9. Accordingly, the magnetic force exerted on the valve body 7 is weakened and the valve body 7 is operated to close the primary passage 4 by its own weight or by the valve closing force of the valve closing spring 12.

The symbol 24 is a resetting means to be used for resetting the shutoff valve 5 when the gas container 1 is installed. The resetting means 24 includes a reset chamber 25 in which is disposed the lower end of the valve stem 7a extending from the valve chamber 6, a push up member 26 provided with a reset handle 27 which projects outwards out of a base frame 30 and also extends into the reset chamber 25 so as to be enabled to contact with the lower end of the valve stem 7a, and a return spring 28 which urges the push up member 26 downward to its returned position, and it is operable to reset the shutoff valve 5 by pushing up the reset handle 27 and the valve stem 7a against the return spring 28 so as for the valve body 7 to be sustained by the attractive force of the magnet 9 against the valve closing force exerted on the valve body 7.

On the other hand, it is desirable that the snap leaf spring 8 is reverted naturally to its original state by removing the abnormally increased pressure in the primary passage 4, and in addition thereto the snap leaf spring may be constructed so as to be reverted to its original state by hand through some components. Further the operation for resetting the shutoff valve 5 may be interlocked with the operation for installing the gas container 1 to the gas oven by linking the reset handle 27 of the reseting means to the handling fittings 29 of a gas container installation device( not shown in Figs.), by which the gas container is installed removably.

According to the present invention, as being constructed and functioning above, the following advantages should now be apparent.

(a) In case the secondary pressure is increased abnormally, there exists no danger of deriving a secondary accident because any fuel gas isn't released to the atmosphere. Particularly, the pressure regurator of the present invention can be applied safely to the gas oven eguipped with the gas cartridge.

(b) In case the secondary pressure is increased abnormally, the abnormal condition can be noticed without any alarms because the burner flames are extinguished by the shutoff of the primary passage.

(c) Even though the secondary pressure is increased abnormally, any fuel gas can't be wasted unnecessarily because any fuel gas isn't released to the atmosphere.

(d) As the valve body of the shutoff valve is operable to close the valve by means of moving away the magnet which is disposed outside the end wall thereof from the valve body and hence it is unnecessary to form the through-hole for operating the magnet in the end wall, there exists no risk of gas leaking.

(e) As the actuator driven by the abnormally increased secondary pressure is operable so as for the magnet to be moved away from the valve body by overcoming the attractive force of the magnet which functions as the valve opening and sustaining force to the valve body and the valve opening an sustaining force is small enough in intensity against the primary pressure, it can be made smaller owing to its small pressure receiving area.

(f) As it is not necessary to provide the valve rod with O-ring or the like because the valve rod doesn't extend through the end wall of the valve chamber to the outside thereof, there is not a risk of their gluing by their secular degeneration, and the reliability of the shutoff valve is improved.

(g) Particularly, in case the shutoff valve is constructed so that the primary passage is closed by the valve body when the magnet provided outside of the snap leaf spring is moved away from the valve body by the expansion of the valve chamber, of which the end wall is sealed by the deformable snap leaf spring, due to the abnormally increased pressure therein, the shutoff valve can also function safely so as to cope with the abnormal increase of the primary pressure.

I claim:

1. A pressure regulator for a fuel gas including a primary passage, a secondary passage and a pressure reducing valve therebetween, characterized in that: said primary passage being provided with a shutoff valve, said shutoff valve being constructed so that a valve body in a valve chamber thereof is urged toward a valve shutoff position by a valve closing force of a valve closing means and is also urged by a magnetic force of a magnet so as to be lifted toward a valve open position against the valve closing force, said maqnet being disposed outside an end wall of the valve chamber opposite to the valve body, said secondary passage being connected to an operation chamber within an actuator, an output portion of said actuator being interlocked with the magnet, when the pressure in the secondary passage is increased abnormally above the predetermined pressure set by the pressure reducing valve, the actuator is driven by the increased pressure so as to move the magnet away from the valve body and weaken the opening force exerted by the magnet and hence said primary passage is closed by means of the valve body urged by the valve closing means, an end wall of the valve chamber being formed by a snap leaf spring, the magnet acting on the valve body through said end wall and the valve chamber being provided with stops for limiting movement of the valve body toward the valve open position; wherein the snap leaf spring in a normal position curves into the valve chamber but when the pressure in the primary passage increases above a limit value, the snap leaf spring is displaced into a configuration in which the snap leaf spring curves outward from the valve chamber, the displacement of the snap leaf spring acting to move the magnet away from the valve body and thereby weaken the magnetic force on the valve body to allow said shutoff valve to move into the shutoff position.

2. A pressure regulator for a fuel gas according to claim 1, wherein the output portion of the actuator being interlocked with the magnet through a movement switching lever.

3. A pressure regulator for a fuel gas according to claim 1, wherein the valve closing means for the valve body of the shutoff valve comprising a spring.

4. A pressure regulator for a fuel gas according to claim 1, wherein the valve closing means for the valve body being the weight of the valve body itself.

5. A pressure regulator for a fuel gas according to claim 1, wherein the axis of the valve chamber in the shutoff valve being directed in such a direction to intersect the longitudinal direction of the primary passage.

6. A pressure regulator for a fuel gas according to claim 5, wherein a reseting means to reset the shutoff valve to its open position being provided on the opposite side of the shutoff valve against the magnet and in opposition to the shutoff valve, said reseting means comprising a reset chamber connected to the pointed end portion of the the valve chamber, a reset operation member which being pushed forward to the shutoff valve in the reset chamber by an outside manipulation, a return spring which urging the reset operation member to its returned position, said reset operation member functioning to reset the valve body of the shutoff valve to the valve open position by being pushed forward from the outside thereof against the return spring.

7. A pressure regulator for a fuel gas according to claim 1, wherein the actuator being a diaphragm cylinder type actuator.

* * * * *